United States Patent [19]

Hoogeboom

[11] 3,931,798
[45] Jan. 13, 1976

[54] CONTROL DEVICE

[75] Inventor: Adrianus Johannes Theodorus Hoogeboom, Harmelen, Netherlands

[73] Assignee: Landi Den Hartog B.V., Groenekan, Netherlands

[22] Filed: Nov. 12, 1973

[21] Appl. No.: 415,271

[30] Foreign Application Priority Data
Nov. 10, 1972 Netherlands.................... 7215280

[52] U.S. Cl................................ 123/120; 48/180 C
[51] Int. Cl.²........................................ F02M 21/02
[58] Field of Search........... 123/120, 179; 48/180 R, 48/180 C

[56] References Cited
UNITED STATES PATENTS

| | | | |
|---|---|---|---|
| 2,346,763 | 4/1944 | Jones................................ | 123/120 |
| 2,988,078 | 6/1961 | Ensign et al..................... | 123/179 L |
| 3,494,750 | 2/1970 | Phipps............................. | 123/120 |

*Primary Examiner*—Wendell E. Burns
*Assistant Examiner*—David D. Reynolds
*Attorney, Agent, or Firm*—Sughrue, Rothwell, Mion, Zinn & Macpeak

[57] ABSTRACT

The invention relates to a control device for a multiple cylinder-piston motor for operation with a gaseous fuel, said control device being connected to the gas conduit, leading from the throat of the venturi-tube in the air suction conduit to the evaporator pressure regulator, as well as to the vacuum conduit, leading from downstream the throttle in said air suction conduit to said evaporator-pressure regulator, said control device comprising a control valve provided with a control mechanism, said control valve being incorporated in said gas conduit and said control mechanism being incorporated in said vacuum conduit, the arrangement, on operation of said throttle from its closed position towards its open position, and reverse, allowing the said control valve to be automatically brought from a position for small gas passage to a position for considerable gas pressure, and reverse.

11 Claims, 3 Drawing Figures

CONTROL DEVICE

The present invention relates to a control device for a multiple cylinder-piston motor, in which, for the operation with gaseous fuel, both the gas conduit, connected to the throat of the venturi-tube in the air-suction conduit towards the motor cylinders and the vacuum conduit, connected to the air suction conduit downstream of the throttle, are connected with the evaporator-pressure regulator in the usual way.

Such a gas carburation system is more and more used for vehicle motors nowadays, in view of air pollution, to limit as much as possible the percentage of harmful components of the exhaust gases, which is determined to a high extent by the ratio of the quantity of available combustion air and the quantity of fuel, here gaseous fuel.

In this respect the attention was first substantially directed to the quantity of carbon monoxide in the exhaust gases, however, in addition thereto also the quantity of non-combusted hydrocarbons and nitrogen oxides in the exhaust gases are considered to be of importance nowadays.

The object of the invention is to provide a multiple cylinder-piston motor, as described above, with a control device which is adapted to considerably decrease the quantities of harmful components in the exhaust gases, also in case these components strongly vary under various conditions of operation. For this purpose the control device according to the present invention comprises a control valve provided with a control mechanism, the control valve being incorporated in the gas conduit and the control mechanism being incorporated in the vacuum conduit, the said arrangement being effected in such a way, that in case of operation of the throttle from the closed position (partial load) towards the open position (full-load), and reverse, the control valve, with the aid of the control mechanism, will automatically be brought from a position for small gas passage to a position for considerable gas passage, and reverse.

According to the present invention it is tried, when operating the throttle from the closed position towards the open position, so when switching from operation at partial load to full-load, to obtain poor fuel mixtures at partial load, and in case of full-load, to use as much as possible the complete combustion of the component parts, occuring at the stoechiometric combustion of the gaseous fuel.

In the control device according to the present invention the airfuel ratio, with respect to the stoechiometric ratio of air-fuel in the poosition of the control valve for small and considerable gas passage respectively, is preferably 1.2 and 1 respectively.

The present invention also comprises an embodiment of the control device, characterized by two bowl portions facing each other with their open ends, between the edges of which a diaphragm of high flexibility has been clamped and the housing of the control valve has been fixed to the bottom of the one bowl portion, at the side facing away from the diaphragm, while leaving in said bottom of said one bowl portion a central opening, through which opening a rod portion of the valve body being extended beyond the valve opening communicating with the passage of the valve housing, said valve body being movable in a longitudinal bore intersecting said passage, extends with play towards the diaphragm to which it has been fixed and a portion of the valve body, facing away from the diaphragm, and being extended beyond the valve opening to close the said passage, being constrained by a compression spring in the direction of opening, the gas conduit being connected with said passage and the vacuum conduit being connected with the other bowl portion, a suction conduit, being connected to the venturi-tube upstream with respect to the gas conduit, further being connected to a passage in the bottom of the said one bowl portion.

In a further embodiment of the control device according to the present invention, the passage in the bottom of the one bowl portion is advantageously adjustable with the aid of an adjustment screw. By means of said screw the effect of the negative pressure active on the diaphragm and transmitted via the suction conduit to the bowl portion connected the control valve, can be controlled.

The present invention furthermore comprises a second embodiment of the control device, which is characterized by two bowl portions facing each other with their open ends, between the edges of which a diaphragm of high flexibility has been clamped and the housing of the control valve has been fixed to the bottom of the one bowl portion at the side facing away from said diaphragm, while leaving in said bottom of said one bowl portion a central opening through which a (second) portion of the valve body, being extended beyond the valve opening communicating with the passage of the valve housing for closing the said passage and being movable in a longitudinal bore intersecting said passage, extends with play towards the diaphragm to which it has been fixed, said (second) portion of the valve body having a bore extending through the diaphragm and comprising a compression spring, the end of which facing towards the bore opening being limitedly movable, a portion of the valve body facing away from the diaphragm, being extended beyond the valve opening for closing the passage and in the direction of opening being controlled by a compression spring, the gas conduit being connected with said passage and the vacuum conduit being connected with said other bowl portion.

In the control device according to the present invention the movement of the valve body at its end facing to the diaphragm is preferably limited by means of an adjustable abutment arranged at the bottom of the other bowl portion, with the aid of which the maximum value of the air-fuel ratio is adjustable.

The present invention also comprises a multiple cylinder - piston motor, provided with a control device according to the invention.

The present invention will now be elucidated on basis of two embodiments, schematically shown in the drawing.

Figure 1:
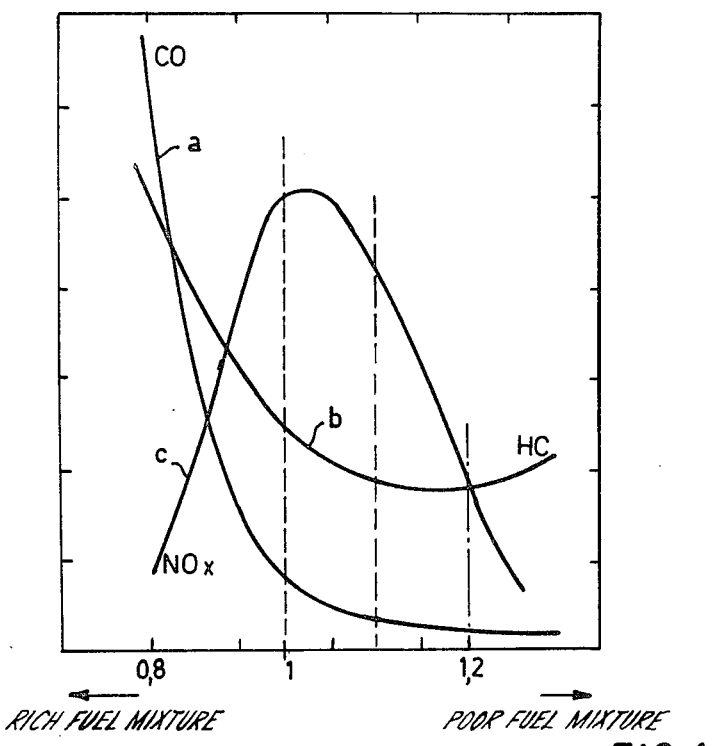
FIG. 1 shows several graphs, from which appear the influence of the air-combustion ratio on the exhaust issues.

Graphs $a$, $b$ and $c$, shown in FIG. 1, indicate for carbon monoxide (CO), hydrocarbons (HC), nitrogen oxides (NOx) respectively the issue concentrations (along the vertical axis) as a function of the air-fuel ratio with respect to a stoechiometric air-fuel ratio (along the horizontal axis). The theoretical, chemically correct ratio 1 for complete combustion has been indicated with a dotted line in FIG. 1, at the left are the rich, at the right poor fuel mixtures. According to FIG. 1 a rich fuel mixture, for instance with the ratio 0.8, provides a high quantity of carbon monoxide (graph $a$) and also a considerably high quantity of hydrocarbons (graph $b$), whereas a poor-fuel mixture, for instance with a ratio of 1.2, provides considerably low quantities of carbon monoxides (graph $a$), hydrocarbons (graph $b$) as well as of nitrogen oxides (graph $c$).

In order to obtain optimal conditions in a multiple cylinder - piston motor with gas carburation system, it has to be considered that 1°: an optimum power is obtained with a mixture of air-fuel ratio with respect to the stoechiometric ratio of approx. 1, indeed resulting in a low quantity of carbon monoxide, however, the quantity of nitrogen oxide will be high and 2°: an optimum issue of exhaust gas is obtained with a mixture of air-fuel ratio with respect to the stoechiometric ratio of approx. 1.2. Such a poor mixture would, however, cause a considerable loss of power under full-load conditions.

From this results that when a motor, intended for particularly application, is allowed to lose a considerable quantity of power, an optimum issue of exhaust gas is possible, in all load circumstances (full-load, partial load and stationary run). In practice, however, a high loss of power will be inadmissible.

With the aid of the control device according to the present invention, applied to a multiple cylinder - piston motor with gas operation, the air-fuel ratio, with respect to the stoechiometric ratio, can be favourably influenced under various load circumstances. Then it is possible to feed to the motor, in the complete range of partial load, a mixture with an air-fuel ratio with respect to the stoechiometric ratio, of preferably 1.2, which value can be varied in the full-load range to a mixture with an air-fuel ratio with respect to the stoechiometric ratio of preferalby 1. Small deviations from the indicated values provided however acceptable results.

In this respect has in particular been in mind motors of fork lift trucks and of vehicles in city traffic, where the motor is substantially operating with partial-load.

Figure 2:
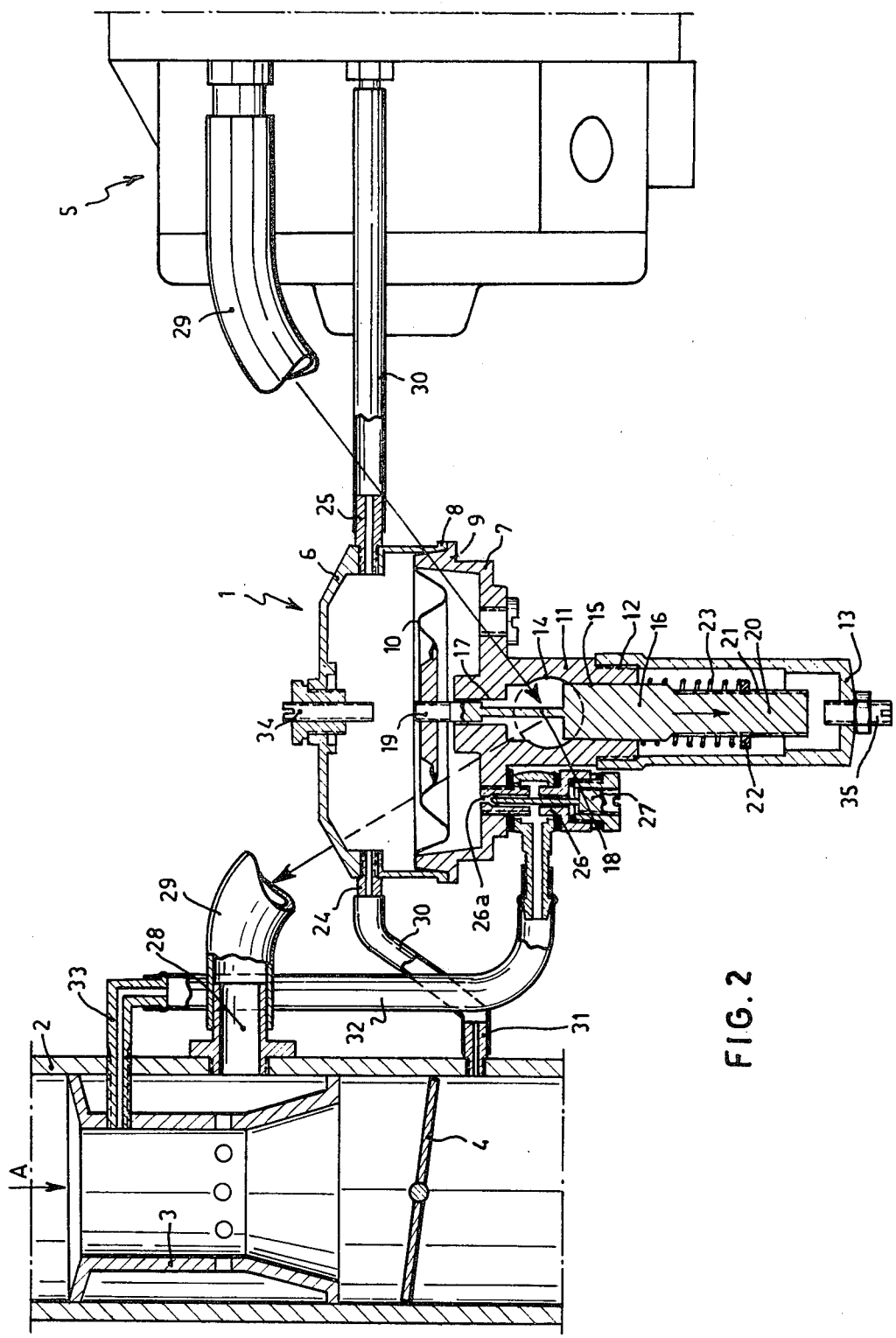
FIG. 2 shows an embodiment of the control device, shown in vertical cross-section, applied to a multiple cylinder - piston motor with components, adapted to gas operation.

In the embodiment of the control device according to the present invention, shown in FIG. 2, and generally indicated by 1, the suction conduit 2 for the combustion air, leading to the motor cylinders (not shown) — including the usual venturi-tube 3 and, seen in the direction of movement of the air (arrow A), downstream of said venturi-tube, the throttle 4 — has been shown at the left, and the usual evaporator pressure regulator, generally indicated by 5, has been shown at the right of the control device 1. The evaporator pressure regulator may be of the type shown in U.S. Pat. No. 2,988,078 issued on June 13, 1961.

The said control device comprises two bowl portions 6, 7, facing each other with their open ends, between the edges 8, 9 of which a diaphragm 10 of flexible material, for instance a synthetic material, has been clamped sealingly. A control valve, the valve housing of which consisting of a solid cylindrical portion 11, which constitutes a unit with the bowl portion 7, and consisting of a hooded part 13, connected with said cylindrical portion 11 by means of a screw thread connection 12, has been provided with a passage 14 and a longitudinal bore 15, intersecting said passage, in which longitudinal bore a valve body having a portion 16 for closing the passage 14, is longitudinally movable. At the end of the portion 16 facing to the bowl portion 7, the valve body, for forming the valve opening, has been extended by a thin rod portion 18, extending upwardly with a certain play through a central opening in the bottom of the bowl portion 7, said thin rod portion being centrally fixed to the diaphragm 10 by means of a thickened end as at 19.

At the end of the portion 16, facing away from the bowl portion 7, the valve body has been provided with a narrowed cylindrical portion 20, which has been provided at its periphery with a screw thread 21, with which cooperates an adjusting nut 22. Between the bottom face of the solid portion 11 of the valve housing and the adjusting nut 22 a compression spring 23 has been clamped, said spring urging the portion 16 of the valve body towards the open position. Connection nipples 24, 25, provided with a longitudinal bore, have been screwed at opposite sides in the wall of the bowl portion 6. A nipple 26, provided with a longitudinal bore as well as a transverse bore connecting therewith, has furthermore been screwed in a passage 26 of the bottom of the bowl portion 7. The opening of the longitudinal bore in the nipple 26 can be closed with the aid of an adjusting screw 27.

The inlet and outlet of the passage 14 in the portion 11 of the valve housing are incorporated in the gas conduit 29, leading from the evaporator-pressure regulator 5 towards a nipple 28 in the throat of the venturi-tube 3.

The space above the diaphragm 10 in the bowl portion 6 of the control device has been incorporated via nipples 24, 25 in the vacuum conduit 30 applied in the known way for the control signal; said vacuum conduit, for controlling the quantity of fuel on starting a stationary running motor, being connected at the one hand to the vapour tension regulator 5 and, at the other hand, being connected via a nipple 31 to the air suction conduit 2, downstream of the throttle valve 4. Finally a suction conduit 32 has been connected, at the one hand, via a nipple 33 to the venturi-tube 3 upstream of the gas conduit 29 and at the other hand, via the transverse bore in the nipple 26, being connected to the space below the diaphragm 10 in the bowl portion 7.

The action of the above described device is as follows. In the partial-load range of the motor, the throttle 4 being partially closed, the motor vacuum, transmitted via the vacuum conduit 30 to the space above the diaphragm 10, is very high. As the compressive force of the spring 23, acting in the direction of opening of the valve body 16, is adjusted at a rather low value via the adjustment nut 22, the diaphragm moves upwardly against an abutment 34, which limits the deflection and has been screwed in the bottom of the bowl portion 6, while bringing the valve body 16 to the closed position, against the action of the spring 23. Thus the passage in the gas conduit 29 is narrowed, due to which a poor fuel mixture appears with an air-fuel ratio with respect to the stoechiometric ratio of approx. 1.2.

Furthermore, in the partial-load range, due to the throttling action of the throttle 4, the quantity of air suck via the venturi-tube 3 being relatively small, a considerably low vacuum is transmitted via the suction conduit 32 to the space below the diaphragm 10. In the full-load range, however, the vacuum in the suction conduit 32 obtains a higher value, so that the larger suction force acting at the bottom side of the diaphragm 10, together with the action of the compression spring 23, have the disphragm, and consequently the valve body 16, moves toward the opening position, because of which a mixture arises with an air-fuel ratio with respect to the stoechiometric ratio of approx. 1. It has to be borne in mind, however, that by the indication "high" vacuum, a pressure is meant lying between 260 and 720 mm mercury pressure abs. and by "low " vacuum is meant a pressure lying between 720 and 760 mm mercury pressure abs.

The maximum value of the air-fuel ratio is adjustable with the aid of the abutment 34. With the aid of the adjusting screw 27, controlling the passage 26a in the bottom of the bowl portion 7, the effect of the vacuum, being transmitted via the vacuum conduit 32 to the space below the diaphragm, can be varied, the play between the rod portion 18 of the valve body and the bore 17 in the bowl portion 7 cooperating therewith for this purpose. For, in case the adjusting screw 27 of the nipple 26 closes the passage 26a completely, and the vacuum in the air suction conduit 2 is not transmitted to the bottom side of the diaphragm via the conduit 32, said space can take the pressure prevailing in the space of the portion 11 of the valve housing, near above the portion 16 of the valve body. When however, the adjusting screw 27 has completely been screwed out, the passage of the nipple 26 being completely free, the suction force in the conduit 32 somewhat weakened by a leak via the play in the bore 17 will dominate.

The application of the suction conduit 32 with the adjusting screw 27 constitutes an additional aid. The vacuum in the conduit 30 and the spring pressure of the spring 23 together would already provide a satisfactory control, having as disadvantage, however, that the portion 16 of the valve body would be opened too easy, in case of acceleration from a low number of motor revolutions. By using also the suction force in the venturi-tube, transmitted via the suction conduit 32 to the space below the diaphragm is obtained that the portion 16 of the valve-body opens at somewhat higher loads and numbers of revolution.

Figure 3:
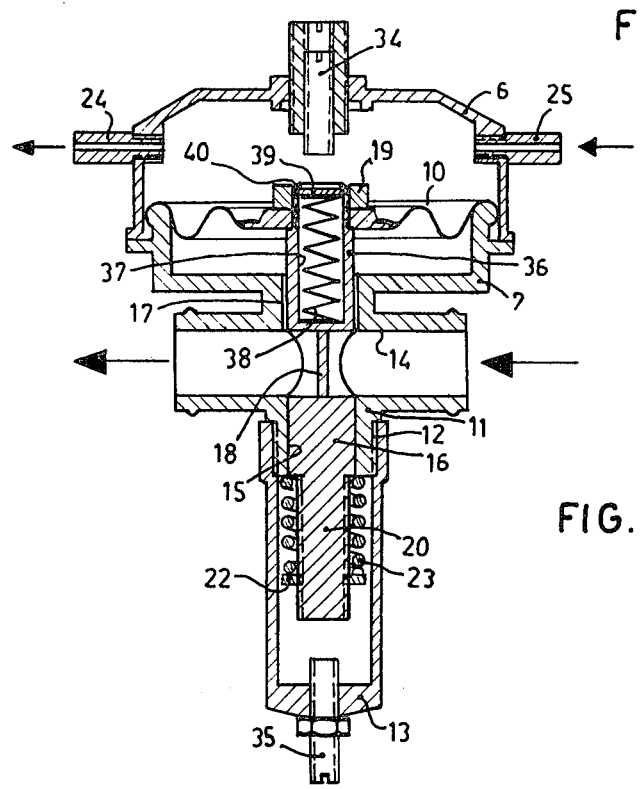
FIG. 3 shows a second embodiment of the control device.

In the embodiment of the control device, shown in FIG. 3, a similar control is obtained, whereby in the partial-load range a poor-fuel mixture is added, but also without application of the suction conduit 32 and the adjustment screw 27, in the full-load range, corrections in the mixture with an air-fuel ratio with respect to the stoechiometric ratio to a value of approx. 1 being possible.

In case of motors having a small number of cylinders (less than four) strong pulsations occur in the suction system, said pulsations often having a disturbing influence on the air-fuel ratio and this in such a way, that the fuel mixture in the full-load, low range of revolutions, can become too rich. This can be avoided in the embodiment of the control device to be described, in which components, corresponding to those of the first described embodiment, have been indicated with the same reference numerals.

The flexible diaphargm 10, being clamped between the bowl portion 6, 7, has again been connected with the portion 16 of the valve body, which is urged towards the open position by the compression spring 23. The solid portion 11 of the valve housing, constituting a unit with the bowl portion 7, being connected with the hooded portion 13 by means of the screw thread connection 12, has the passage 14 and the longitudinal bore 15, intersecting said passage 14, in which bore the valve body, with the portion 16 is longitudinally movable for closing the transverse bore 14. At the end of portion 16, facing to the bowl portion 7, the valve body has been extended with a thin rod portion 18, which has been connected at 19 with the diaphragm 10 by means of a thickened end, extending with a certain play upwardly through the central opening 17 of the bowl portion 7.

Departing from the first described embodiment, the thickened end at the rod portion 18 has a periphery having a size which is equal to that of the portion 16 of the valve body, thereby constituting in fact a second portion 37 of the valve body, which — as can be seen in the drawing — is also adapted for closing the passage 14 when the diaphragm moves downwardly. The second portion 36 has furthermore been provided with a longitudinal bore 37 to receive a compression spring 38, supporting at the one hand against the bottom of the bore 37 and at the other hand against a closing plate 39, which is axially slidable in the bore, and which normally is pressed by the spring 38 against a radially inwardly flanged edge 40.

The inlet and outlet of the passage 14 — which has been shown in FIG. 3 as turned over an angle of 90° in comparsion with the embodiment shown in FIG. 2 — in the portion 11 of the valve housing have been connected to the gas conduit 20, whereas the space above the diaphragm in the bowl portion 6, has been connected via the nipples 24, 25, with the vacuum conduit 30, leading from the nipple 31 downstream of the throttle 4 in the air suction conduit 2 to the evaporator-pressure regulator 5.

The device operates as follows. In case of partial-load, the vacuum downstream of the thottle 4, being transmitted to the space above the diaphragm via the vacuum conduit 30, is considerably high, because of which the portion 16 of the valve body, is drawn upwardly in the passage 14, against the action of the spring 23 and to decrease the gas passage, due to which first the closing plate 39 abuts against the abutment 34 and then the spring 38, the resiliency of which is for instance somewhat larger than that of the spring 23, is compressed. Then the fuel mixture will be made poorer until the air-fuel ratio with respect to the stoechiometric ratio, will be approx. 1.2.

In the full-load range, in which the throttle 4 is opened, the motor vacuum being rather low and being transmitted to the space above the diaphragm via the conduit 30, will move downwardly, and consequently the valve system, under the influence of the action of the compression spring 23, in order to enrich the fuel mixture, until the air-fuel ratio, with respect to the stoechiometric ratio, will be approx. 1. However, at a full-load in case of a low number of revolutions, the motor vacuum downstream of the throttle 4 can become low to such a degree, that the second protion 36 of the valve body will be drawn into the transverse bore 14. Because of this, the gas conduit 29 is partially closed, to avoid that the fuel mixture supplied in the air suction conduit 2 will be too rich. When the number of revolutions is increasing, in case of full-load, the motor vacuum will become somewhat higher, because of which the portion 36 of the valve body, under the load of the spring 23, will be successively drawn upwardly from the transverse bore 14, so that the passage in the gas conduit 29 will become free again.

The adjustable abutment 35, shown within the hooded portion 13 in FIG. 2 and 3, serves for adjusting the position of the open position of the portion 16 of the valve body.

What is claimed is:

1. A control device for controlling the amount of gaseous fuel delivered from a source of fuel to an air suction conduit wherein said fuel is mixed with air, said conduit having a venturi tube and a throttle plate therein, comprising:
   a. a housing, having a passage therethrough, said passage having one end connected to said source of fuel and the other end connected to said air suction conduit;
   b. valve means disposed in said housing so as to selectively block said passage;
   c. a flexible diaphragm affixed to and located with said housing so as to define a first chamber on one side of said diaphragm and a second chamber on an opposite side of said diaphragm;
   d. means connecting said diaphragm to said valve means such that movement of said diaphragm causes said valve to open and close said passage;
   e. first means connecting said first chamber to said air suction conduit downstream of said throttle plate such that when said throttle plate is closed or partially opened, a vacuum in said first vacuum chamber causes said valve means to partially close said passage so as to restrict the flow of fluel therethrough; and
   f. second means connected to said housing to cause said valve means to open said passage when said throttle plate is fully opened.

2. The control device of claim 1 wherein said second means comprises:
   a. a second conduit connected to said suction conduit; and
   b. means connecting said second conduit to said second vacuum chamber.

3. The control device of claim 2 further comprising means for manually adjusting the area of a connecting opening between said second chamber and said means connecting said second conduit to said second chamber.

4. The control device of claim 3 wherein said means for manually adjusting said area comprises a needle valve.

5. The control device of claim 2 wherein said second conduit is connected to the venturi tube of said suction conduit.

6. The control device of claim 1 wherein said housing comprises:
   a. a first bowl shaped portion;
   b. a second bowl shaped portion having its periphery attached to the periphery of said first bowl shaped portion; and
   c. a cylindrical extension attached to said second bowl shaped portion and extending therefrom, said extension having a first passage therethrough to allow passage of said gaseous fuel and a second passage oriented perpendicular to said first passage and along the longitudinal axis of said cylindrical extension wherein said valve means is disposed in said second passage.

7. The control device of claim 6 wherein said flexible diaphragm has its periphery attached to said housing at the joint of said first and second bowl-shaped portions.

8. The control device of claim 6 further comprising spring means interposed between said valve means and said cylindrical extension to bias said valve means in an open position.

9. The control device of claim 6 further comprising manually adjustable stop means through said first bowl shaped portion to adjust the maximum deflection of said flexible diaphragm.

10. The control device of claim 1 wherein said second means to cause said valve means to open said passage is a spring connected between said housing and said valve means to bias said valve means in an open position when the vacuum in said first chamber drops below a predetermined valve.

11. The control device of claim 9 wherein second spring means are provided between said valve means and said manually adjustable stop means.

* * * * *